United States Patent [19]
Lindgren et al.

[11] Patent Number: 5,768,260
[45] Date of Patent: Jun. 16, 1998

[54] DEVICE FOR CHANGING THE TRANSMISSION PARAMETERS IN A RADIO TRANSMITTER

[75] Inventors: Ingemar Lindgren, Älvsjö; Sven-Rune Olofsson, Luleå; Greger Isaksson, Piteå, all of Sweden

[73] Assignee: Telefonaktiebolaget LM Ericsson, Stockholm, Sweden

[21] Appl. No.: 607,874

[22] Filed: Feb. 29, 1996

Related U.S. Application Data

[63] Continuation-in-part of Ser. No. 253,249, Jun. 2, 1994, abandoned.

[30] Foreign Application Priority Data

Jun. 2, 1993 [SE] Sweden ................ 9301882

[51] Int. Cl.$^6$ ................ H04J 3/14; H04B 17/00
[52] U.S. Cl. ................ 370/252; 455/423; 455/67.4; 455/426; 455/500
[58] Field of Search ................ 370/241, 248, 370/253, 252, 328, 336, 337, 345, 347; 375/224, 295, 316; 379/57, 58, 59; 455/33.1, 53.1, 54.1, 67.1, 67.2, 67.3, 67.4, 422, 423, 458, 426, 456, 500, 502; 371/3, 20.1

[56] References Cited

U.S. PATENT DOCUMENTS

| | | | |
|---|---|---|---|
| 4,408,322 | 10/1983 | Chadwick et al. | 370/252 |
| 4,930,118 | 5/1990 | Sugihara | 370/227 |
| 5,046,128 | 9/1991 | Bennett | 455/51 |
| 5,109,535 | 4/1992 | Kume et al. | 455/67.4 |
| 5,124,985 | 6/1992 | Hoshikawa | 455/54.1 |
| 5,280,471 | 1/1994 | Kondou et al. | 370/347 |
| 5,293,423 | 3/1994 | Dahlin et al. | 380/48 |
| 5,295,140 | 3/1994 | Crisler et al. | 370/443 |
| 5,369,637 | 11/1994 | Richardson et al. | 370/281 |
| 5,442,811 | 8/1995 | Kobayashi et al. | 455/67.3 |
| 5,457,812 | 10/1995 | Siira et al. | 455/67.4 |

FOREIGN PATENT DOCUMENTS

| | | |
|---|---|---|
| 2 024 567 | 1/1980 | United Kingdom. |
| WO90/04889 | 5/1990 | WIPO. |

OTHER PUBLICATIONS

ETS 300 133-1, European Telecommunications Standards Insitute 1992, pp. 1-26 Jul. 1992.

ETS 300 133-4, European Telecommunications Standards Institute 1992, pp. 1-40, Jul. 1992.

*Primary Examiner*—Chi H. Pham
*Assistant Examiner*—Ricky Q. Ngo
*Attorney, Agent, or Firm*—Burns, Doane, Swecker & Mathis, L.L.P.

[57] ABSTRACT

In a radio system of the digital simultaneous type comprising a number of radio transmitters, information is transmitted on the same nominal frequency. The system is also intended to transmit specific test information, with the intention of achieving optimal performance of measuring receivers. Receivers, either measuring receivers or conventional receivers, register their geographical location in the system and the reception conditions of different stations with the aid of the test information. The measuring result is returned to the transmitter stations, to decide which measures shall be taken. When this return of the measuring result from the reception area is automatic, changes in the transmission parameters will be effected automatically and continuously while taking prevailing traffic situations into account.

15 Claims, 2 Drawing Sheets

DEVICE FOR CHANGING THE TRANSMISSION PARAMETERS IN A RADIO TRANSMITTER

This application is a continuation-in-part of U.S. Pat. Application Ser. No. 08/253,249, filed Jun. 2, 1994 now abandoned.

TECHNICAL FIELD

The present invention relates to the transmission of information in digital radio communications networks and to measuring the signal conditions in a receiver situation. Transmitted information relates to digital communication, and all stations within a region or area, for instance within a country or some other geographically defined area, transmit on one and the same frequency and with simultaneous transmission of the information, in other words a so-called simultaneous network.

BACKGROUND

A number of methods are known in the art for transmitting information in radio communications networks that include a plurality of transmitters. With the intention of avoiding interference between the stations, stations that have partially the same coverage area have been allocated different frequencies, time slots or code. In systems which use different frequencies, the receivers are required to change to the frequency to be received at that moment in time. The same applies to time-shared or code-shared systems.

In the case of paging systems for instance, there is a desire to be able to use the same frequency within wide areas, thereby simplifying receiver construction among other things. In addition, the simultaneous principle is often used when transmitting. One of the problems that occur in a system of this kind resides in the synchronization of the signal when transmitting from the different stations. It is necessary to synchronize the signal when transmitting, so as to minimize the synchronization error at the receivers caused by the differences in propagation time to receivers in the system. These differences in propagation time are mostly due to the fact that the receivers are located at different distances from the different listenable transmitters. Another problem that is liable to arise in unfavorable conditions is negative carrier wave interference between stations, wherein the signal may be extinguished temporarily. This is caused by uncontrolled carrier wave offset between the stations in combination with equal signal strengths of transmitters in a receiver site.

SUMMARY

In the case of known radio communications within areas or regions that have a plurality of transmitters which transmit simultaneously on mutually the same frequency, there is a need to change parameters in transmitting stations in order to optimize receiving conditions. The present invention relates particularly to a device which can be used in such known radio communications for radio paging. The European Radio Message System (ERMES) according to the European Telecommunication Standard (ETS) is one example of a known paging system and is described in a series of publications including ETS 300 133-1, 133-4; July, 1992, Source ETSI TC-PC.

Simultaneous transmission in an area or region using a plurality of transmitters on the same frequency makes reception of digital information difficult in those areas or regions in which some form of negative interference occurs between the transmitters. When the signals from several stations have mutually equal signal strengths at a receiver, it is important that the signals arrive at the receiver within a specific time interval and with a controlled carrier wave offset between the transmitters, otherwise the signals will be detected erroneously and reception is made impossible within the area or region in which the receiver is located. In this case, it is desirable to change the transmission parameters of the stations, so as to improve reception conditions. It may also be necessary to make this change during operation, when the traffic situation and the receivers located in the area or region so require. A measuring receiver which is mobile and whose geographical position can be determined shall be able to identify the station that is received. This receiver shall be able to assess the signal properties and therewith the reception conditions on the measuring site.

It shall be possible to feed the measuring result back to the system, for the purpose of changing the transmission parameters of the station automatically.

The object of the present invention is to solve the problems mentioned above.

A radio communications network having a plurality of transmitters within one area or region has been arranged. The same nominal transmission frequency is used by base stations within a common area or region. In order for information, comprised of digital information, to be transmitted simultaneously throughout the entire network, it is necessary to accurately synchronize the stations. This synchronization is effected, for instance, via a satellite which transmits global time signals, or with the aid of some other synchronizing algorithm, for instance with the base stations included in synchronization chains in a "master-slave" relationship. Information is transmitted from respective radio transmitters at predetermined times. The time difference between the receipt of a message from the various stations in the system is permitted to differ to an extent corresponding to a predetermined part of an information bit in the message sequence. The receivers receive signals from those stations within whose coverage area they are located. Since the signal is transmitted simultaneously from different transmitter stations, the signal will arrive at the receivers at different delay times caused by differences in propagation times. In unfavorable circumstances, this time difference will imply that the digital signal cannot be detected clearly or unambiguously by the receiver, despite adequate signal strength. When measuring the system with the aid of measuring receivers, these signal properties are registered at different sites together with positional information, and are then sent to the stations. The measuring receivers may be provided with means for identifying their geographical positions, therewith enabling the disclosure of these positions to be automated.

Information from the transmitters is transmitted in blocks, destined for predetermined receivers or predetermined groups of receivers. A number of such blocks are accommodated in a frame. Each block contains an information part and address information. The radio communications system utilizes the fact that the capacity of the information part is used only partially during certain periods. Instead, test information is transmitted in these free slots and is intended to be received by mobile measuring receivers within the coverage area of the station. In this state, transmission takes place from only one station at a time in order to enable the measuring receiver to identify the transmitters concerned and to obtain optimal measuring possibilities. In this regard, each station is allocated a specific block within the frame.

The test information includes data which discloses which station in the receiver area that transmits. According to one embodiment of the invention, this data can also be used to avoid locking the station to a predetermined block. The test information is registered in the measuring receiver and the signal properties are analyzed. The registered data and the signal properties are then returned to the radio communications system together with a positional indication for any adjustments that may be needed. This return is effected in a known manner, for instance by providing the measuring receiver with a transmitter for retransmitting information, or by enabling the measuring receiver to return the information with the aid of other techniques, for instance by data transmission over the telephone network.

According to one embodiment of the invention, the measuring receiver utilizes the identity of the transmitting station contained in the test information. The stations are not locked to specific blocks when applying this method. This provides flexibility when measuring the reception conditions from respective stations. In this case, the measurements may be placed in one or several of the blocks, when remaining blocks cannot be used for test information because of high traffic loads. In this case, the receivers are provided with transmitter identification means.

The test information is placed at the end of the information part. This implies that test information can be transmitted, even when other information is transmitted via the block. On the other hand, test information cannot be transmitted when the standard information fills the block.

Test information is transmitted when it is considered optimal from one aspect or another, for instance when traffic intensity so permits or when the radio system operator considers it necessary. In the case of a fully automated system, initiation of the transmission of test information is controlled by higher order system functions.

The measuring result is used to identify the regions in which the signal is distorted. The reception in regions in which signals are distorted can be improved, for instance, by changing transmission power or the main power direction, by changing the synchronization offset or by changing the carrier wave offset at one of the stations concerned. As a result, the signals will become distorted in another region or area. By suitable selection of transmission parameters, this critical region or area can be placed in a geographical location in which the harm caused is small or non-existent.

In a fully automated system according to another embodiment of the present invention, it will be possible for conventional receivers to function also as measuring receivers and to send the measuring result back to the stations, although this is probably not the case in a normal paging system using present-day techniques. In this case, the stations utilize the test information to adjust the transmission parameters so that the network can be utilized to the best possible effect in all states with regard to the traffic situation.

The method enables transmitted signals to be detected by receivers with a higher degree of certainty. Furthermore, the method enables good receiving conditions to be redistributed from regions or areas of small receiving requirement to areas or regions where reception is weaker but where there is a need for better reception.

The method also enables the receiving conditions of the radio system to be followed-up continuously within different geographical areas. The radio coverage can also be redistributed within different areas or regions with regard to prevailing traffic requirements.

A further advantage is that mobile, handportable measuring receivers can be used to register the signal conditions in different geographical locations. Handportability is, in principle, impossible without transmitting test information, since this greatly simplifies the construction of the measuring receiver. The measuring receivers register signal properties and geographical positions in parallel during a measuring process. As before mentioned, the test information transmitted from respective radio stations includes station identification. The advantage afforded by test information which is normally only sent when traffic intensity so permits is that the radio system is influenced to a minimum with regard to its capacity.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DESCRIPTION

Embodiments of the invention will now be described with reference to the accompanying drawings.

In one embodiment of the present invention a system having a number of radio stations and receivers is considered. The radio stations operate on the same nominal carrier wave frequency. The information transmitted from the stations is digital and simultaneous. The information shall arrive at the receiver from the radio stations simultaneously when the propagation distance between respective stations and the receiver is the same.

In order for signals transmitted from respective stations to arrive simultaneously at receivers which are located at mutually the same propagation distance from the stations, it is necessary for the stations to have been synchronized. This synchronization is effected, for instance, with global time signals which are transmitted with great precision from satellites or synchronizer chains. The internal clock found in the stations is set with an accuracy necessary to the functionality of the system. Test information is also sent on chosen occasions with bit patterns which enable the desired type of measuring processes to be carried out. For instance, these measuring processes may concern carrier wave measuring, synchronization measuring, "man made noise" or measuring signal strength. The test information also includes base station identification. The test information may be transmitted from one base station at a time, and is preferably so transmitted in the case of simultaneous-type digital radio systems. In other words, when other audible stations in the area have a break in transmission. The method performed by the present system enables measuring receivers to be constructed more simply and optimizes measuring performance.

Figure 1:
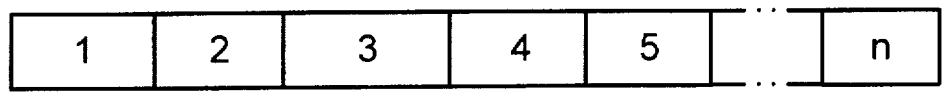
FIG. 1 illustrates a frame of transmitted information used in an embodiment of the present invention.
Figure 2:
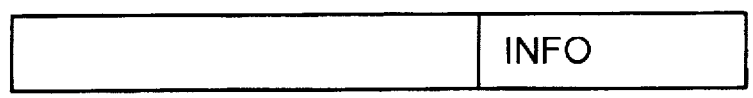
FIG. 2 illustrates a block of the frame shown in FIG. 1.

FIG. 1 illustrates a frame in which information is transmitted sequentially and which includes a number of blocks 1–n. FIG. 2 shows a simplified representation of one such block. Each block contains information directed to a receiver or a group of receivers. Among other things, the block includes an information part from which the receivers identify the message as illustrated in FIG. 2. The information part includes a varying amount of information, depending on the length of the message. This means that the information part will have space that can be used in those instances when the total capacity has not been used. This part is used for test information, when so permitted. In the above mentioned known ERMES system, a frame as illustrated in FIG. 1 of the present invention corresponds to one "cycle" and a block as illustrated in FIG. 2 of the present invention corresponds to a "batch". Examples of the cycle and the batch are illustrated in FIG. 1 on page 11 of ETS 300 133-4.

The test information is transmitted, for instance, in the information part of the first block. Transmission is effected from only one transmitter, so that the measuring receiver will not be disturbed by remaining transmitters. The measuring receiver identifies the transmitter by the transmitter identification included in the test information. Alternatively, each transmitter may be locked to a specific block. In this case, the receiver identifies the transmitter by identifying the block received.

Figure 3:
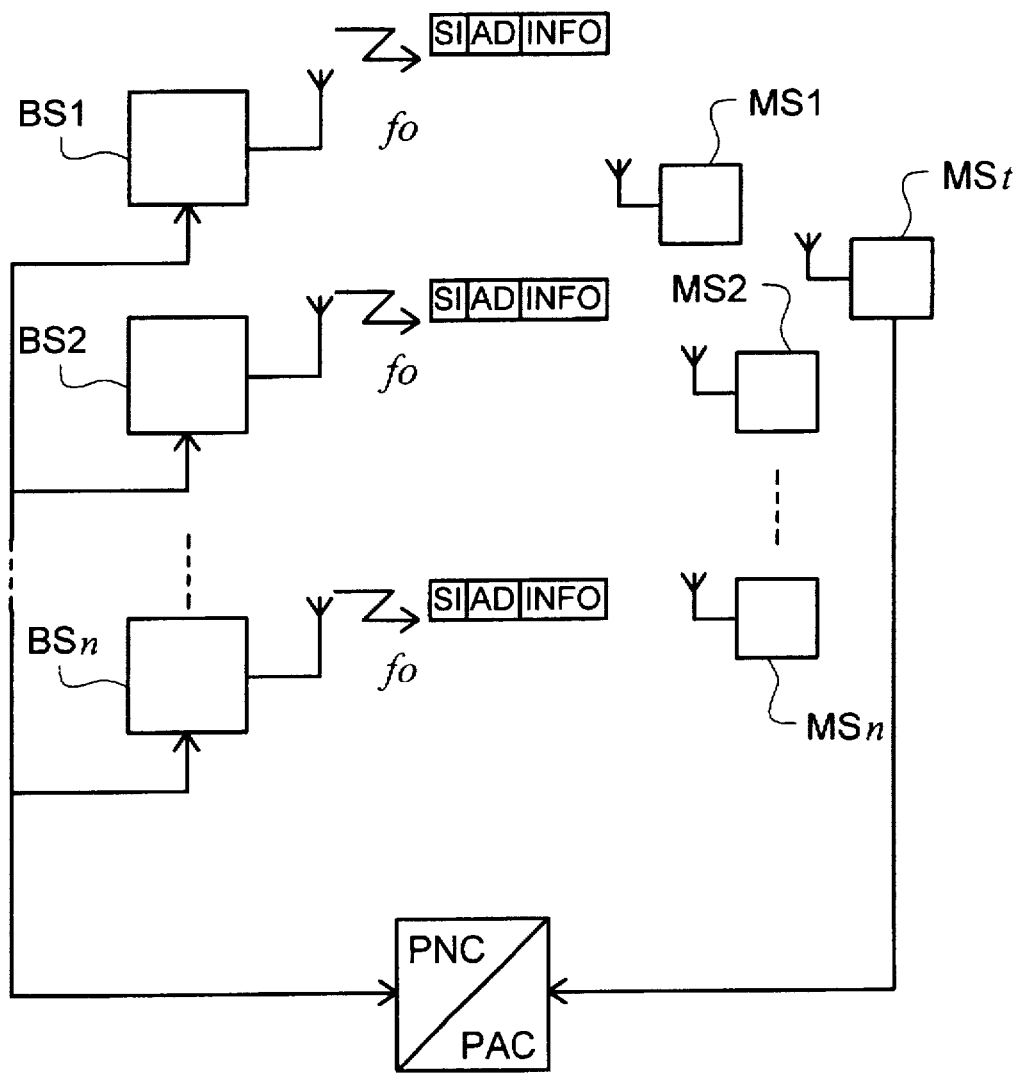
FIG. 3 illustrates a radio system used in an embodiment of the present invention.

FIG. 3 shows a simplified block diagram of a radio system according to an embodiment of the present invention which uses, for example, the so-called ERMES type system mentioned above. As shown in the ETS 300 133-1:1992, on page 21, there are a number of base stations BS1,BS2, . . . BSn which transmit simultaneously radio signal messages to a number of mobile stations MS1,MS2, . . . in a group of stations located in a certain geographical area. of course several other groups of mobile stations can be located on several other geographical areas.

All the radio signals are simultaneously broadcasted on the same carrier frequency (fo) to the mobile stations. Therefore the radio network is characterized as a simultaneous network. The operation of the network is controlled by a paging network controller PNC and a paging area controller PAC as described in ETS 300 133-1, pages 18–21. In FIG. 3 these units have been merged for representation as one single block designated PNC/PAC.

In order that the proper message should reach the proper mobile station when the base stations transmit simultaneously, a particular information format has been specified as is illustrated in FIG. 1 on page 11 of ETS 300 133-4 and described in "Information format" at Section 6 on pages 15–22 of ETS 300 133-4. The frame and block illustrated in FIGS. 1 and 2 in the present application generally relate to the structure of the radio protocol illustrated in FIG. 1 of ETS 300 133-4. In FIG. 3 of the present application, the signals sent out from each of the base stations BS1-BSn have been indicated as consisting of a system information field SI identifying the sending base station, an address field AD (A1-An) identifying the respective destinated receiver and a field "INFO" corresponding to the INFO-field in FIG. 2 containing the message to be sent.

When no test signal is transmitted from the base stations BS1-BSn, these base stations BS1-BSn send the messages to the mobile stations MS1-MSn simultaneously as mentioned above. When one or more test signals are transmitted together with the message in the information field (designated INFO in FIG. 2), each base station transmits in its own block in order to avoid collision of the test signals from other base stations. According to the present embodiment, the test information is sent in part of the INFO-field of a block which is not occupied by any other message information as described below.

One or more mobile stations MS1-MSn can operate as measuring receivers in the system of FIG. 3. Alternatively, a measuring receiver can consist of a separate and fixed station MSt designed solely for its purpose to treat and process test information.

From each measuring receiver a connection to the central units of the radio system has been provided to deliver the measurement results or result of analysis of the received test signals. If the measuring receiver is one (or more) of the ordinary mobile stations, this connection is a radio path and the test results are sent back to the PNC/PAC unit via radio signals to the base station from the mobile station communicating with this base station (address AD in received message). If the measuring receiver is a separate station MSt, it can be wire connected to the PNC/PAC unit directly in order to deliver the measurement results and/or the result of the analysis of the received and measured test signals.

Figure 4:
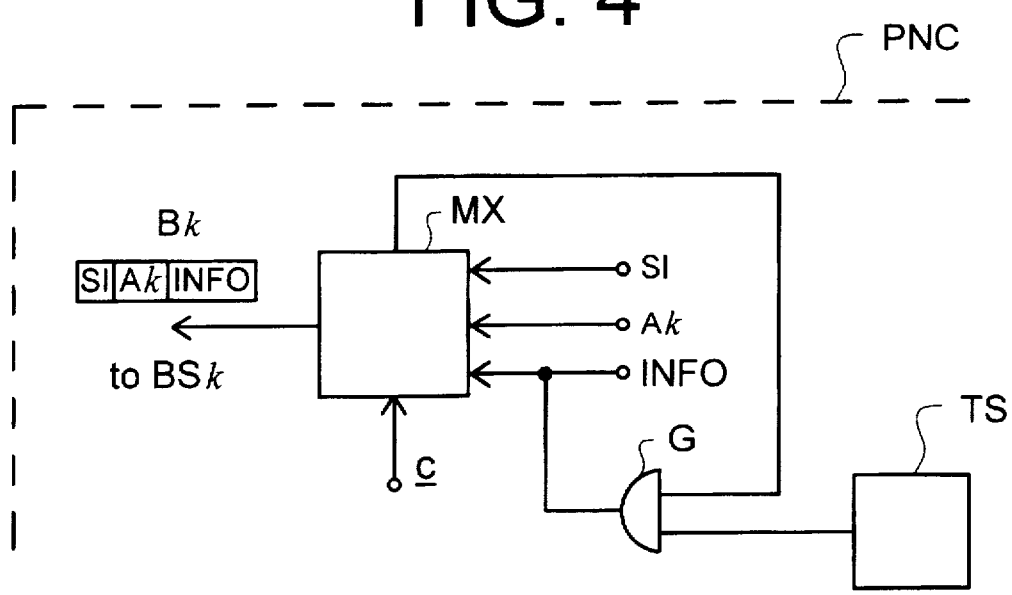
FIG. 4 illustrates a block diagram for a transmitter of a base station in an embodiment of the present invention.

FIG. 4 illustrates a block diagram of the elements for a transmitter of a base station in an embodiment of the present invention. This transmitter may generate the test information and combine this with the usual message information in a block.

The paging network controller PNC has a central processor including the ERMES protocol software and software to generate the various control signals for transmission, particularly for control of the base station hardware for the radio transmission. In this particular case the controller PNC also includes a test generator which is an integrated part of the PNC processor or connected to the processor.

When the processor in the PNC during the transmission of a certain block (named "batch" in the ERMES specification ETS 300), discovers that not all the message partition of the block is used, it orders the test information to be interleaved with the other information in the empty space of the message partition (in FIG. 3 designated INFO) of the block.

The block diagram of FIG. 4 illustrates a multiplexor MX in the controller PNC for multiplexing the words SI, the address Ak of a certain base station BSk and the information INFO containing $\underline{n}$ bits. This control is performed by the controller PNC in response to a control signal via the terminal $\underline{c}$.

A test generator TS generates a desired test sequence and is connected to one input of an AND-gate G whose other input is connected to the multiplexor MX.

The multiplexor MX includes storing and logic circuits which store the length of the INFO-word in the block Bk and a sensing circuit which senses the last $\underline{m}$ (m<n) bits in the INFO-word. If a certain number of "zeros" have been discovered in these last m bits in the INFO-word, a signal is sent to the AND-gate G and the test word is allowed to be supplied to the multiplexor MX. The complete block Bk including the test information as a part of the INFO-word is thereafter transferred to the radio parts of the base station BSk in the same manner as ordinary information bits in the INFO-word.

The INFO-word can be the so called AII (Additional Information Indicator) and the VIF (Variable information field) as shown, for example, in "THE CONCEPT FOR WORLD WIDE PAGING" Section 7.2.4. "Message Partition".

An intended receiver, e.g. MSt, can evaluate after transmission the received test information based on the test sequence from the test generator TS which is known to the receiver.

In an embodiment of the present invention, it can be decided whether the parameters of the transmitters should be adjusted or not, by registering the reception conditions with measuring receivers located at different places within the areas covered by the stations. Information relating to the measuring result is then transmitted to central units for adjustment of the measuring data of the stations. This transmission is effected in a known manner, for instance by the measuring receivers transmitting the result on a radio channel which is received by a monitoring function. Information concerning the reception conditions can be registered continuously in this way. The received information is received and processed and continuous adjustments can be introduced with regard to the transmission parameters of the different stations. The measuring receivers can also store information in a memory storage or like device. In this latter case, the information is transmitted by playing back the information in devices intended herefor at the central functions. The information can also be transmitted over the telephone network or data network. In this case, the information is adapted to a format in which it can be transmitted over respective networks. The central functions receive the information and take the necessary measures. The bit stream transmitted from the base stations includes information that is to be received by different receivers. Each receiver identifies its part of the message for decoding. A message transmitted from a station to a receiver will arrive at the receiver at time t after transmission. The same message transmitted from another station will arrive at the receiver at time T after transmission. The possibility of the receiver detecting a transmitted signal correctly will depend on the time point at which respective signals reach the receiver. If the time difference T-t exceeds the acceptance limit for detection, there is a risk that the signal will be detected wrongly, bit error.

In order to avoid error detection, the stations have been synchronized so that signals from respective stations are received within a time interval that corresponds to a predetermined part of an information bit, according to the aforegoing. When T-t exceeds the acceptance limit, it can be adjusted by changing the synchronization offset at one of the base stations. The time interval is determined while taking into account the functionality of the system and also the propagation times that can occur. The receivers also obtain varying reception conditions within different areas or regions. These variations depend partly on geographical circumstances and partly on the effect that the stations have on one another. For instance, the signal is amplified within certain regions and weakened within other regions.

Areas with weak reception can be changed to acceptable reception areas, by changing parameters such as transmission power, synchronization offset or carrier wave offset, for instance. This is done, however, at the cost of those regions which earlier had acceptable reception conditions. It is possible, however, to redistribute unfavorable regions or areas to geographical regions or areas in which radio traffic is light or non-existent.

The measuring receivers pass through the coverage areas of the transmitters when measuring-up the system. Data relating to the geographical position of the measuring receivers is registered, as is also the measuring result. This information is transmitted to the stations for processing. The transmission parameters of the stations are then changed when such changes are necessary.

The receivers included in the system may, in the future, possibly function as measuring receivers for changing the transmission parameters automatically in accordance with prevailing situations. For instance, this enables optimization of the reception condition directed to the area or region that is relevant at that moment in time.

The invention is not restricted to the aforedescribed and illustrated exemplifying embodiment since modifications can be made within the scope of the following Claims and within the concept of the invention.

We claim:

1. An arrangement for transmitting test information in a radio communications network, comprising:

a plurality of transmitters and a plurality of receivers, wherein information is transmitted digitally on a radio channel which is common to the radio communications network, and wherein the information has been divided into a number of blocks whose information content can be addressed to specific receivers or to a group of receivers, and wherein a number of blocks forms a frame, and a specific transmitter is allocated a specific block in the frame;

and the information part of said block contains test information from said specific transmitter when so required or when free information space is available;

and solely that transmitter to which the block has been allocated will transmit the test information when measuring is in progress by receivers receiving the test information; and the receivers receive the test information and identify the transmitter that has been received on the basis of the geographical location of the receivers and on the basis of the block received or by station identification, and register reception conditions of the receivers which are returnable to the radio communications network for necessary adjustment.

2. An arrangement according to claim 1, wherein the radio communications network is preferably a paging system.

3. An arrangement according to claim 1, wherein each block contains information relating to the identity of the transmitter from which the test information derives.

4. An arrangement according to claim 1, wherein the receivers are provided with identification means for identifying the transmitter from which the information is received.

5. An arrangement according to claim 1, wherein the transmitters are allocated space for test information in a block when the free capacity of the block so permits.

6. An arrangement according to claim 1, wherein the test information is preferably stored at the end of the information part of said block.

7. An arrangement according to claim 1, wherein the test information contains transmitter identification data.

8. An arrangement according to claim 2, wherein each block contains information relating to the identity of the transmitter from which the test information derives.

9. An arrangement according to claim 2, wherein the receivers are provided with identification means for identifying the transmitter from which the information is received.

10. An arrangement according to claim 2, wherein the transmitters are allocated space for test information in a block when the free capacity of the block so permits.

11. An arrangement according to claim 2, wherein the test information is preferably stored at the end of the information part of said block.

12. An arrangement according to claim 2, wherein the test information contains transmitter identification data.

13. An arrangement according to claim 5, wherein the test information is preferably stored at the end of the information part of said block.

14. An arrangement according to claim 5, wherein the test information contains transmitter identification data.

15. An arrangement according to claim 6, wherein the test information is preferably stored at the end of the information part of said block.

* * * * *